July 20, 1937.  W. JONES  2,087,407

HYDRAULIC VALVE

Filed Nov. 8, 1934  2 Sheets-Sheet 1

INVENTOR.
William Jones.
BY Moses & Nolte
ATTORNEYS.

July 20, 1937.   W. JONES   2,087,407
HYDRAULIC VALVE
Filed Nov. 8, 1934   2 Sheets-Sheet 2
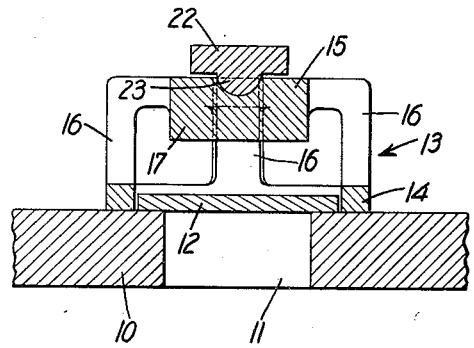
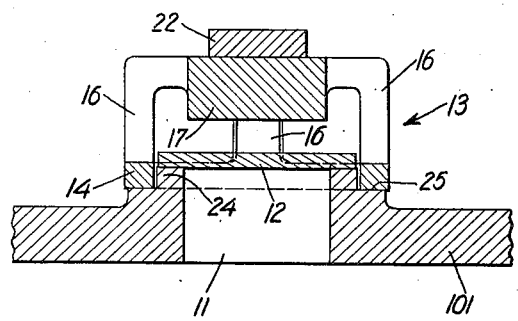
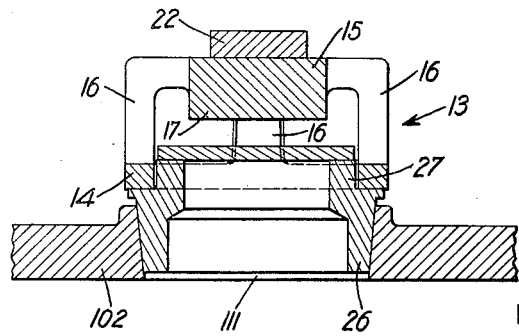
INVENTOR.
William Jones.
BY
ATTORNEYS.

Patented July 20, 1937

2,087,407

UNITED STATES PATENT OFFICE 2,087,407

HYDRAULIC VALVE

William Jones, Linden, N. J.

Application November 8, 1934, Serial No. 752,032

4 Claims. (Cl. 277—60)

The present invention relates more particularly to hydraulic valves and has for its object a provision of a structural organization in which the valve and all of its associated parts are readily accessible for replacement and repair and which may be installed with great facility and which are generally rugged and simple in construction.

More specifically the invention relates to a pumphead and pumphead valves therefor which are adapted to handle large quantities of liquid and which are generally installed in banks, each bank containing a plurality of such valves.

Another object of the invention is to provide such valves for installation on the exterior face of the pumphead and to provide a simple and rugged means for anchoring the valve and its associated parts, such anchoring means being readily manipulated for installation of the valves as well as for replacement and repair of such valves and their associate parts.

In the accompanying drawings forming a part of the present application are shown several embodiments of the present invention. It will be understood, however, that such drawings are merely illustrative of the several embodiments of the invention and that to a person skilled in the art, various modifications of these embodiments falling within the scope of the appended claims will be apparent.

Fig. 3 is a sectional view taken on the line 3—3 of Fig. 1.

Fig. 4 is a view similar to Fig. 3 of a modification of the present invention.

Fig. 5 is a view similar to that shown in Fig. 3 of a further modification of the present invention.

Figure 1:
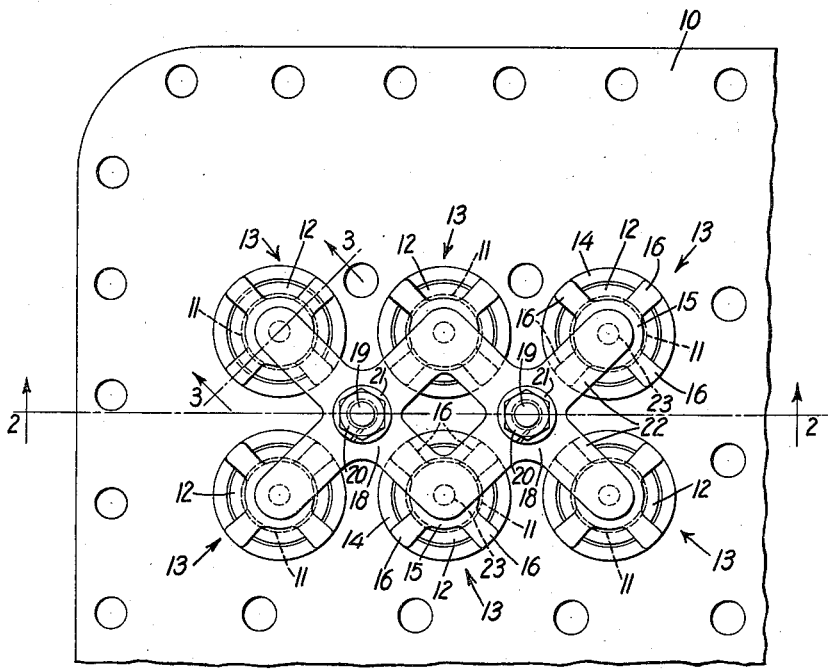
Fig. 1 is a plan view of a part of a pumphead and a bank of valves installed on the exterior face of the pumphead.

While the present invention embodies principles of construction and operation which may be applicable to a variety of uses, it is specifically illustrated in connection with a type of pump which is adapted to handle large quantities of liquid. The pumphead 10 which is generally in the form of a plate is in such pumps provided with a large number of outlet openings 11 which are commonly arranged in banks, a bank of 6 having been illustrated in Fig. 1. For the purpose of fully describing the present invention it is sufficient to show one portion of the pumphead 10 and one bank of openings 11 and the valves associated therewith. The valve element 12 is shown in the form of a metal disc placed on the top or exterior face of the pumphead 10 immediately over each of the openings 11. It will be understood, however, that the valve element may be of any form desired to cooperate with the specific form of outlet opening 11. In the present invention the valve element 12 is freely floating and is lifted from its closing position by a pressure of the stream of liquid flowing through the opening 11 and is returned to its closing position by gravity when the flow of the liquid through the opening 11 is cut off by the operation of the pump. The valve element 12 therefore falls with the reduction of pressure in the pump with the result that the noises due to the operation of the valve are minimized. The valve element 12 is maintained in operative position immediately over the opening 11 by the cage 13, there being one such cage for each valve element 12 and each opening 11. The cage 13 which is preferably a rugged integral metal casting has a ring 14 at its lower open end, a head 15 at its upper end and a series of legs 16 uniting the head with the ring. The cage, therefore, provides several lateral openings which permit the free flow of the stream of liquid which passes through the opening 11 in the pumphead 10. The cage is so designed that the total area of such lateral openings is at least as great as the area of the opening 11 and if desired may be made to exceed the area of the opening 11 and thereby provides a free and unobstructed path for the stream of liquid passing through the opening 11. The result is that the valve of the present invention does not generate any back pressure against the operation of the pump.

The head 15 of the cage is provided with an integral boss 17 protruding inwardly into the cage which serves as a stop for the upward movement of the valve element 12. In practice the cages 13 are manufactured of uniform dimensions. Under some conditions, however, it may become desirable to lengthen the path of travel of the valve element 12; in such cases it is a relatively easy matter to turn down the face of the boss 17 for this purpose. It will now be understood that the cage 13 retains the freely floating valve element 12 and permits the same to operate gently and with a minimum of noise within the cage and over the opening 11 in the pumphead 10.

Figure 2:
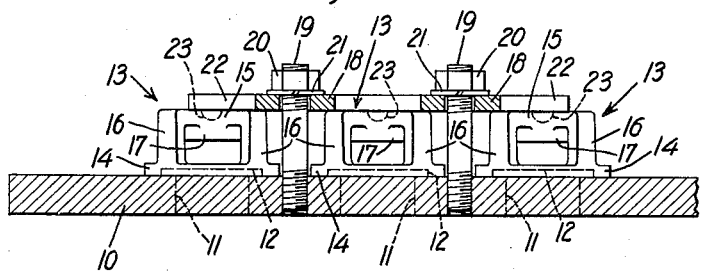
Fig. 2 is a sectional view taken on the line 2—2 of Fig. 1.

In order to firmly anchor the cages in position a plate 18, preferably in the form of a crowfoot as shown in Fig. 1 is employed. This plate is bolted to the pumphead 10 by means of two bolts 19 which are preferably screw threaded at each end, one end being threaded into threaded openings in the pumphead 10, as shown in Fig. 2, and the upper end receiving the nuts 20. A split lock washer 21 is preferably interposed between the nut 20 and the plate 18. The plate 18 is provided with a series of toes 22 which extend over the head of each cage 13. It will be understood that as the nuts 20 are driven home the toes 22 will press the cages firmly against their seats and the washers 21 provide a sufficient amount of resiliency to permit sufficient pressure against each of the cages by this simple construction.

The structures thus far described are applicable to all forms of the invention shown in the drawings. These forms vary from each other only in the manner in which the cages are firmly and positively held properly positioned relative to the openings 11 in the pumphead 10. In the form shown in Figs. 1, 2 and 3 the cages rest upon the upper flat surface of the pumphead. In order to position these cages firmly and positively the head 15 on each cage is provided with a recess which receives the teat 23 on the lower face of each toe 22 thus providing a firm and positive engagement between each toe and its cage.

In the form shown in Fig. 4 the pumphead plate 101 is provided with a raised annular shouldered portion 24, this shouldered portion providing a seat 25 for the cage 13 and the portion 24 serving as a positive positioning means for the cage. The valve element 12, it will be seen, rests on top of the shouldered portion 24. In this construction, therefore, the head 151 of the cage is not recessed and the lower faces of the toes 22 are flat and these toes serve only to press upon the cage 13 and to hold the same firmly in position.

In the form shown in Fig. 5 the opening 111 in the pumphead plate 102 is larger than the openings 11 in the other forms and is tapered inwardly. A sleeve 26 having a corresponding tapered outer face fits into the opening 111 and the upper end of the sleeve is provided with the annular shouldered portion 27 which cooperates with the cage 13 in the manner already described in connection with Fig. 4. In the construction shown in Fig. 5 the internal diameter of sleeve 26 at its upper end is of the same dimensions as the openings 11 in the other forms of the invention.

In the pumps known hitherto the port openings of the pumphead were obstructed by webs, studs, etc. with the result that such openings had to be made much larger than in the practice of the present invention. The form shown in Fig. 5 provides means whereby the advantages of the present invention may be applied to pumps now in use in that the sleeves or seats 26 may be inserted in such openings and serve as adapters so that the new type of valve organization may be employed in lieu of the old type.

The present valve structure may be used on flat pumphead plates as shown in Fig. 3 or it may be used on pumphead plates having raised seats as shown in Fig. 4. It will also be understood that the invention is applicable either to the type of pump which uses the plate valve or a ball valve.

By means of the present invention the frictional resistance to the flow of liquid is reduced with the result that power consumption is reduced. Slippage or leakage back into the pump barrel is also decreased by means of the present invention.

I claim:

1. A pumphead valve adapted for use in an assembly of pumphead valves upon a planiform deckplate, said valve comprising a freely floating disc valve disposed over a valve-seat opening in the pumphead, a one-piece cage resting on the pumphead deckplate and having a bottom part confining the valve and permitting a limited free movement of said valve within said cage, and means for anchoring the cage on the pumphead, said means comprising a member secured removably upon the deckplate for engaging the top of the cage freely and holding it against axial and lateral displacement.

2. In combination, a planiform pumphead having a deckplate with a plurality of valve-seat openings, freely floating discs disposed over said valve-seat openings, a cage disposed over each of said openings and each retaining one of said valves in such manner as to permit free and limited movements of said valve, and a crowfoot plate anchored removably to the pumphead, said plate and cages having interengaging means for positioning said cages, said plate being removable readily, leaving said cages and valves unattached and respectively movable non-rotatably to free the valve seats upon the deckplate for unhampered inspection and repair.

3. In combination, a pumphead having a multiplicity of valve seats in approximately the same plane, a freely floating disc valve disposed over each valve seat to close the same, said valves being initially exposed in a common plane closely adjacent to the deckplate, and each resting freely on the pumphead, a cage disposed over each of said valve-seats, each cage consisting of a unitary metal casting having spaced upstanding legs disposed in circumferential arrangement around the valve, and a head at the upper end of said cage uniting said legs, a series of crowfoot plates each anchoring a group of said cages on said pumphead, means to properly position the several cages of each group freely under its crowfoot plate and means for anchoring each plate on said pumphead in such a manner as to permit ready removal of each crowfoot plate, its cages, and valves, in the order named, to expose the underlying deckplate quickly at any desired region thereof, or throughout its extent.

4. In combination, a pumphead having a multiplicity of outlet openings, freely floating valves disposed over said openings, cages disposed over said openings and enclosing the valves to permit free reciprocal movements of said valves, said cages resting freely on said pumphead, bosses extending interiorly of said cages and serving as stops for the upward movements of said valves to govern the lifts thereof, a crowfoot plate having a multiplicity of toes extending over said cages, means for anchoring said crowfoot plate removably to the pumphead, and interengaging complemental bosses and recesses on said cages and said crowfoot plate respectively to prevent lateral shifting of the cages with reference to said plate and to the openings in the pump-head.

WILLIAM JONES.